United States Patent
Yamamoto et al.

(10) Patent No.: US 12,468,288 B2
(45) Date of Patent: Nov. 11, 2025

(54) MACHINE TOOL CONTROL DEVICE

(71) Applicant: FANUC CORPORATION, Yamanashi (JP)

(72) Inventors: Kenta Yamamoto, Yamanashi (JP); Yuuki Kumamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 401 days.

(21) Appl. No.: 18/006,863

(22) PCT Filed: Jul. 27, 2021

(86) PCT No.: PCT/JP2021/027741
§ 371 (c)(1),
(2) Date: Jan. 25, 2023

(87) PCT Pub. No.: WO2022/025057
PCT Pub. Date: Feb. 3, 2022

(65) Prior Publication Data
US 2023/0266741 A1 Aug. 24, 2023

(30) Foreign Application Priority Data
Jul. 29, 2020 (JP) .................... 2020-128263

(51) Int. Cl.
*G05B 19/4155* (2006.01)
(52) U.S. Cl.
CPC ............. *G05B 19/4155* (2013.01); *G05B 2219/45044* (2013.01)
(58) Field of Classification Search
None
See application file for complete search history.

(56) References Cited

U.S. PATENT DOCUMENTS

2016/0176004 A1 6/2016 Miyaji
2018/0307196 A1* 10/2018 Oho ................ B23Q 15/12
(Continued)

FOREIGN PATENT DOCUMENTS

CN 110695762 A 1/2020
JP 2003-330545 A 11/2003
(Continued)

OTHER PUBLICATIONS

International Search Report issued in PCT/JP2021/027741; mailed Oct. 12, 2021.

*Primary Examiner* — Ryan A Jarrett
(74) *Attorney, Agent, or Firm* — Studebaker Brackett PLLC

(57) ABSTRACT

Provided is a machine tool control device that can generate movement commands of any required command form and that can also suppress the deviation of a peak position during air cutting. A machine tool control device 1 that performs processing while making a tool and a workpiece oscillate relative to each other. The machine tool control device 1 comprises an oscillation conditions setting unit 11 that sets oscillation conditions, an oscillation phase division unit 12 that divides an oscillation phase into a plurality of segments, a layered command calculation unit 13 that, for each of the divided segments, calculates a layered command as a movement command on the basis of the oscillation conditions, and a position and speed control unit 17 that makes the tool and the workpiece oscillate relative to each other on the basis of the layered commands.

4 Claims, 6 Drawing Sheets

(56) References Cited

U.S. PATENT DOCUMENTS

2019/0064764 A1    2/2019  Watanabe
2020/0156200 A1*   5/2020  Nakaya .................. G05B 19/19

FOREIGN PATENT DOCUMENTS

| JP | 2005-182581 A | 7/2005 |
| JP | 2018-181210 A | 11/2018 |
| JP | 2019-028831 A | 2/2019 |
| JP | 2020-017249 A | 1/2020 |

* cited by examiner

MACHINE TOOL CONTROL DEVICE

TECHNICAL FIELD

The present invention relates to a machine tool control device.

BACKGROUND ART

Conventionally, oscillation cutting has been sometimes applied as a countermeasure against chips in drilling and turning. For example, there has been proposed a technique for setting a change point from a machining direction to a counter-machining direction so that the tool returns to a predetermined position that corresponds to a predetermined amount of feed of the tool when the tool returns in the counter-machining direction in the reciprocal movement of the tool with respect to a workpiece, and generating a movement command for instructing a tool to pass through the change point (for example, see Patent Document 1). This technique is said to make it possible to perform oscillation cutting according to the amount of feed of the tool.

Patent Document 1: Japanese Unexamined Patent Application, Publication No. 2020-17249

DISCLOSURE OF THE INVENTION

Problems to be Solved by the Invention

Incidentally, to achieve the oscillation cutting, there is known a method for generating a movement command (also referred to as a superimposition command) in which a sinusoidal oscillation command is superimposed on a position command, and relatively oscillating a tool and a workpiece based on the movement command, for example. However, since this movement command includes the position command and the like, a peak position of the movement command deviates from a peak position of the oscillation command, which leads to the deviation in a peak position during air cutting by the oscillation cutting. Since the deviation in the peak position during air cutting causes a deterioration in the surface roughness of a machined surface, there is a demand for a technique for suppressing the deviation in a peak position during air cutting.

In addition to the deviation in the peak position of the movement command, an actual position of the machine tool may deviate from a command position due to various influences. Therefore, there is a demand for a technique capable of generating a movement command of any required command form.

Means for Solving the Problems

An aspect of the present disclosure provides a machine tool control device that performs machining while relatively oscillating a tool and a workpiece, the machine tool control device comprising an oscillation condition setting unit that sets oscillation conditions, an oscillation phase division unit that divides an oscillation phase into a plurality of segments, a movement command calculation unit that calculates a movement command based on the oscillation conditions for each of the divided segments, and a control unit that relatively oscillates the tool and the workpiece based on the movement command.

Effects of the Invention

According to an aspect of the present disclosure, there can be provided a machine tool control device that can generate a movement command having a desired arbitrary command form and can suppress the deviation in the peak position during air cutting.

PREFERRED MODE FOR CARRYING OUT THE INVENTION

Hereinafter, an embodiment of the present disclosure will be described in detail with reference to the drawings.

Figure 1:
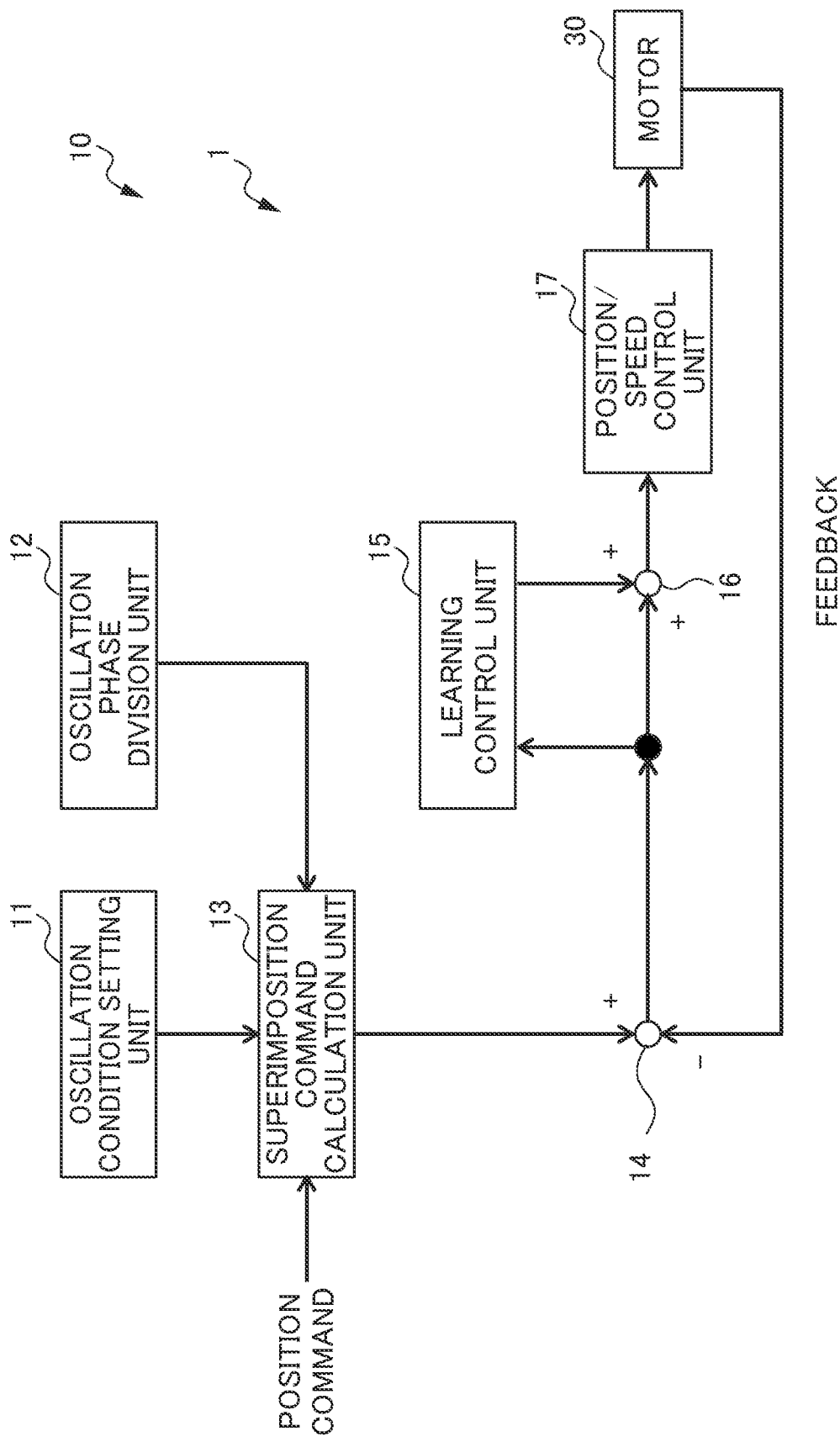
FIG. 1 is a diagram showing a configuration of a machine tool control device according to an embodiment of the present disclosure.

FIG. 1 is a diagram showing a configuration of a machine tool control device 1 according to an embodiment of the present disclosure. As shown in FIG. 1, the machine tool control device 1 according to the present embodiment includes a servo control device 10, and controls driving of a motor 30 that drives a feed axis.

As shown in FIG. 1, the machine tool control device 1 according to the present embodiment includes an oscillation condition setting unit 11, an oscillation phase division unit 12, a superimposition command calculation unit 13, a first adder 14, a learning control unit 15, a second adder 16, and a position/speed control unit 17.

In the machine tool control device 1 according to the present embodiment, a position command generation unit (not shown) generates a position command for the motor 30 based on machining conditions. As shown in FIG. 1, the generated position command is input to the superimposition command calculation unit 13 of the servo control device 10.

The oscillation condition setting unit 11 sets oscillation conditions. Specifically, the oscillation condition setting unit 11 sets an oscillation amplitude or oscillation amplitude multiplying factor, and an oscillation frequency or oscillation frequency multiplying factor. The oscillation conditions including the oscillation amplitude or oscillation amplitude multiplying factor, and the oscillation frequency or oscillation frequency multiplying factor are input to the superimposition command calculation unit 13.

The oscillation phase division unit 12 divides an oscillation phase into a plurality of segments. For example, the oscillation phase division unit 12 divides an oscillation phase for one oscillation into a plurality of segments. The division of the oscillation phase by the oscillation phase division unit 12 will be described below in detail.

The superimposition command calculation unit 13 calculates a superimposition command serving as a movement command based on at least the oscillation conditions and the position command. Specifically, the superimposition command calculation unit 13 directly determines the superimposition command in which an oscillation command is added to the position command, from the oscillation conditions such as an oscillation amplitude multiplying factor and an oscillation frequency multiplying factor, and the position command according to machining conditions. Alternatively, the superimposition command calculation unit 13 directly determines the superimposition command from the oscillation conditions such as an oscillation amplitude and an oscillation frequency, and the position command. As in the latter case, the superimposition command may be calculated without using the machining conditions if an oscillation amplitude and an oscillation frequency are set without being changed in the oscillation conditions, and in this case, it is also applicable to a case where an oscillation axis is stopped.

A feature of the superimposition command calculation unit 13 of the present embodiment is that a superimposition command serving as a movement command is calculated based on the oscillation conditions for each of segments divided by the oscillation phase division unit 12. The calculation of a superimposition command for each of divided segments will be described below in detail.

An example shown in FIG. 1 shows a configuration on the order of position, and the superimposition command calculation unit 13 calculates a superimposition command based on the position command. However, the superimposition command calculation unit 13 is not limited thereto, and may calculate a superimposition command based on a speed command, with the configuration on the order of speed.

The first adder 14 calculates a deviation from the superimposition command. Specifically, the first adder 14 calculates a positional deviation, which is a difference between a position feedback based on position detection by an encoder provided in the motor 30 of the feed axis and the superimposition command.

The learning control unit 15 calculates a compensation amount for the superimposition command based on the positional deviation, and then causes the second adder 16 to add the calculated compensation amount to the superimposition command to compensate the superimposition command. The learning control unit 15 includes a memory, allows the memory to store the oscillation phase and the compensation amount in association with each other in one cycle or a plurality of cycles of oscillation, and at a timing at which a phase delay of an oscillation operation according to responsiveness of the motor 30 can be compensated, reads the superimposition command stored in the memory and outputs the superimposition command as a compensation amount to the second adder 16. When an oscillation phase for outputting the compensation amount does not correspond to the oscillation phases stored in the memory, the learning control unit 15 may calculate a compensation amount to be output, from the compensation amounts of similar oscillation phases. In general, the higher the oscillation frequency, the greater the deviation with respect to the superimposition command, whereby it is possible to improve followability to a cyclic superimposition command with a compensation by the learning control unit 15.

The position/speed control unit 17 generates a torque command for the motor 30, which drives the feed axis, based on the superimposition command after addition of the compensation amount, and controls the motor 30 with the generated torque command. Thus, machining is performed while the tool and the workpiece oscillate relative to each other.

Figure 2:
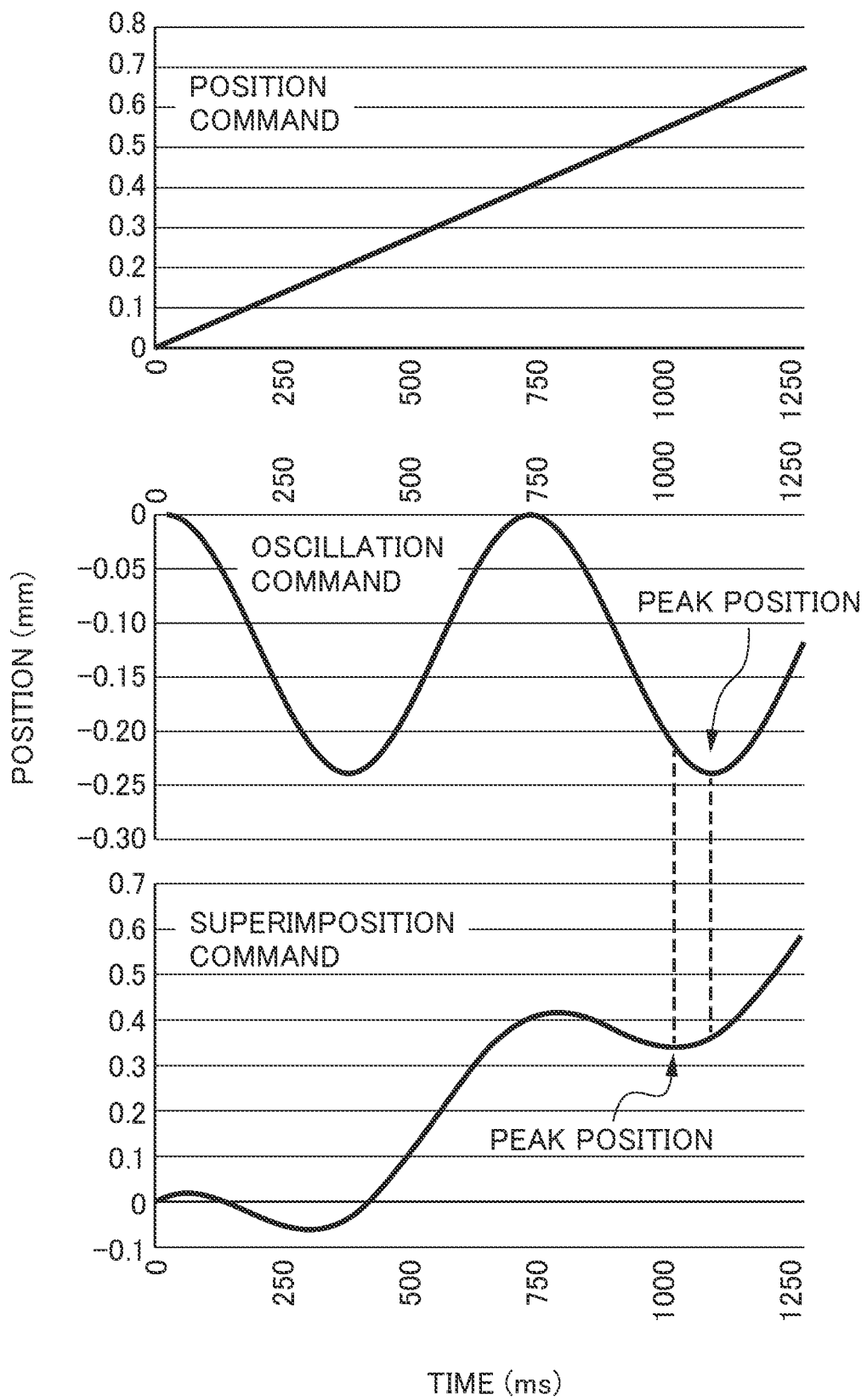
FIG. 2 is a diagram showing each peak position of a superimposition command and an oscillation command in conventional oscillation cutting.
Figure 3:
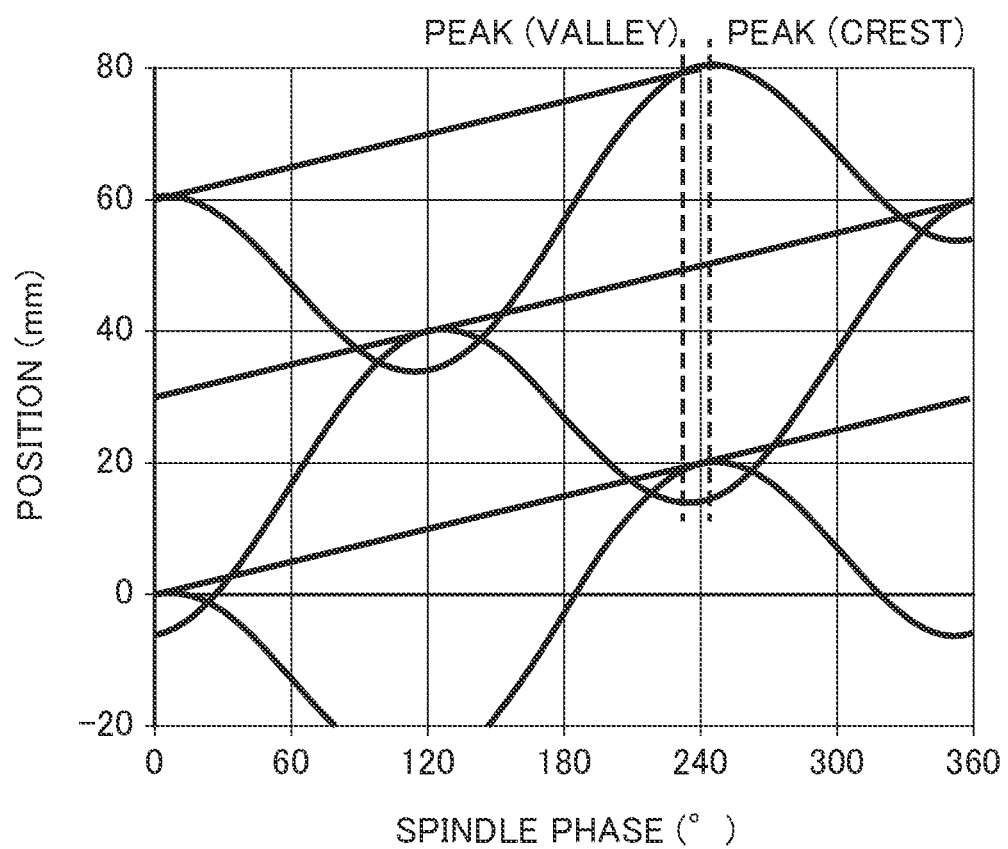
FIG. 3 is a diagram showing the deviation in a peak position of the superimposition command in the conventional oscillation cutting.

Next, a description will be given in detail with reference to FIGS. 2 and 3 with respect to the division of the oscillation phase by the oscillation phase division unit 12 and the calculation of the superimposition command for each of the divided segments by the superimposition command calculation unit 13. Here, FIG. 2 is a diagram showing each peak position of a superimposition command and an oscillation command in conventional oscillation cutting. FIG. 3 is a diagram showing the deviation in a peak position of the superimposition command in the conventional oscillation cutting.

FIG. 2 shows the position command, the oscillation command, and the superimposition command (movement command) in this order from the upper stage. In FIG. 2, a horizontal axis represents a time (milliseconds), and a vertical axis represents a position (mm). The position command shown in the upper stage in FIG. 2 is a linear position command in case of no oscillation, the position command causing a tool to be moved at a constant speed. The oscillation command shown in the middle stage in FIG. 2 is a conventional common sinusoidal oscillation command, but in addition to such a sinusoidal oscillation command, examples of oscillation commands include a cosinusoidal oscillation command. The superimposition command shown in the lower stage in FIG. 2 is a superimposition command calculated by superimposing (adding) the sinusoidal oscillation command shown in the middle stage on the linear position command shown in the upper stage.

FIG. 2 shows that a peak position of the superimposition command serving as the movement command shown in the lower stage does not coincide with a peak position of the oscillation command shown in the middle stage, and therefore the deviation between both peak positions is occurring. This is because the superimposition command is calculated by adding the oscillation command to the position command.

Incidentally, the superimposition command shown in the lower stage in FIG. 2 is represented by Equation (1) below. That is, the superimposition command is calculated by adding the position command represented by the first term in Equation (1) below and the oscillation command represented by the second term in Equation (1) below.

[Expression 1]

$$Y = \frac{FS}{60}t + \frac{KF}{2}\left\{\cos\left(2\pi\frac{SI}{60}t\right) - 1\right\} \quad \text{Equation (1)}$$

In Equation (1), Y represents a superimposition command serving as a movement command, F represents a feed amount per rotation (mm/rotation), S represents a spindle rotation number (min$^{-1}$), I represents an oscillation frequency multiplying factor (times), and K represents an oscillation amplitude multiplying factor (times).

Here, a speed command Y' is calculated by differentiating the superimposition command Y serving as the movement command. Specifically, the speed command Y' is represented by Equation (2) below.

[Expression 2]

$$Y' = \frac{FS}{60} - \frac{KF}{2} \cdot \frac{2\pi SI}{60}\sin\left(2\pi\frac{SI}{60}t\right) = \frac{FS}{60}(1 - \pi KI\sin\theta) \quad \text{Equation (2)}$$

The peak position of the superimposition command is a position when the speed is zero. Therefore, Equation (3) below is derived from Equation (2) above.

[Expression 3]

$$1 - \pi KI \sin \theta = 0 \quad \text{Equation (3)}$$

$$\sin \theta = \frac{1}{\pi KI}$$

Here, α is represented by Equation (4) below.

[Expression 4]

$$\alpha = \sin^{-1}\left(\frac{1}{\pi KI}\right) \quad \text{Equation (4)}$$

Then, the peaks appear at $\theta=\alpha$ and $\pi=\alpha$, and therefore it can be seen that the peak position of the superimposition command deviates from the peak position of the oscillation command by α. In this way, it can be seen from the equation representing the superimposition command that the peak position of the superimposition command deviates from the peak position of the oscillation command.

As described above, FIG. 3 is a diagram showing the deviation in the peak position of the superimposition command in the conventional oscillation cutting, and is a diagram showing each successive pass of the superimposition command of FIG. 2. In FIG. 3, a horizontal axis represents a spindle phase (°), and a vertical axis represents a position (mm). When the oscillation frequency multiplying factor is n.5 times (n is an integer equal to or greater than 1), the peak positions usually coincide with each other at crests and valleys if the superimposition command follows the oscillation command. The superimposition command shown in FIG. 3 is a superimposition command when the oscillation frequency multiplying factor is 1.5 times. When the oscillation frequency multiplying factor is 1.5 times, the air cutting usually occurs when the spindle phases are 0°, 120°, and 240°.

FIG. 3 shows that in an air cutting (idle swing) portion in which passes of the successive superimposition commands overlap with each other due to the above-described deviation of the peak position of the superimposition command with respect to the peak position of the oscillation command, the position of the crest deviates from the position of the valley, and therefore the deviation in the peak position is occurring. When the deviation in the peak position in the air cutting portion thus occurs, the air cutting is horizontally long in the feed direction, which may exert an adverse influence on the surface roughness of the machined surface.

In the present embodiment, the oscillation phase is divided into a plurality of segments by the oscillation phase division unit 12, and the superimposition command is calculated for each of the divided segments, by the superimposition command calculation unit 13, whereby the position of the crest coincides with the position of the valley in the air cutting portion to suppress the deviation in the peak position. This makes it possible to prevent the air cutting from being horizontally long in the feed direction and reduce the deterioration in the surface roughness of the machined surface.

Figure 4:
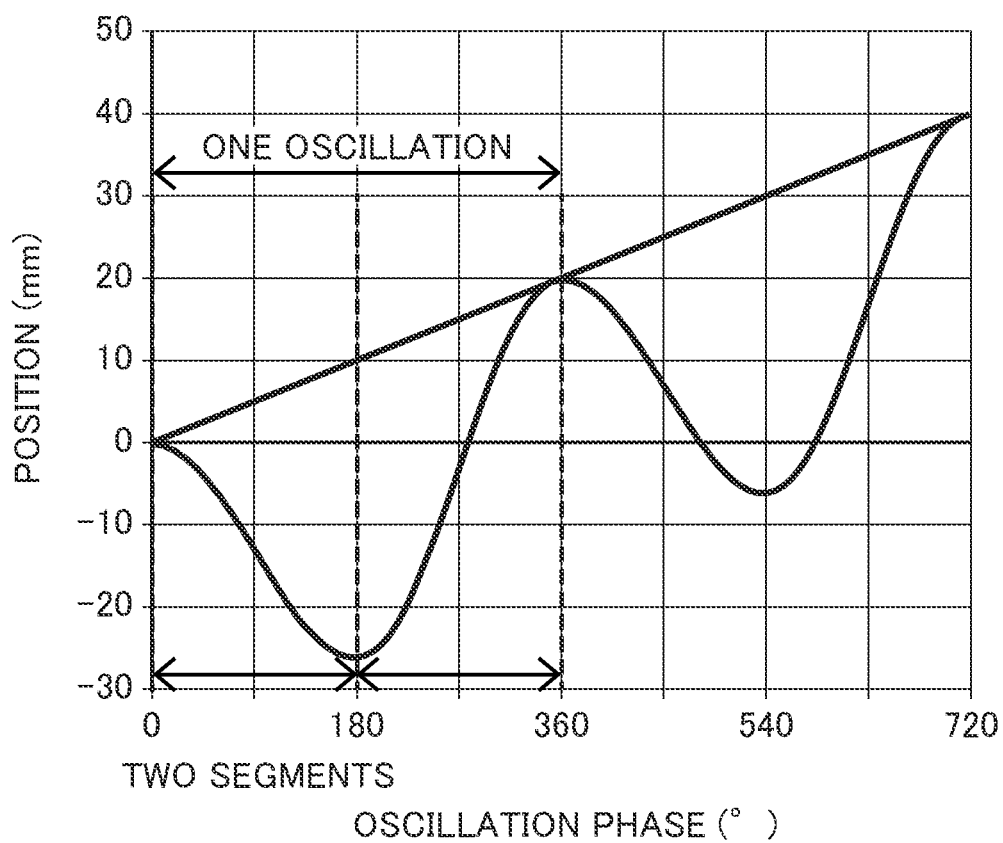
FIG. 4 is a diagram showing a superimposition command calculated for each of two segments into which an oscillation phase for one oscillation is divided, in oscillation cutting of an embodiment of the present disclosure.

A description will be given with respect to a specific example of the superimposition command in the oscillation cutting according to the present embodiment. FIG. 4 is a diagram showing a superimposition command calculated for each of two segments into which an oscillation phase for one oscillation is divided, in the oscillation cutting of an embodiment of the present disclosure. In FIG. 4, a horizontal axis represents an oscillation phase (°), and a vertical axis represents a position (mm). The superimposition command shown in FIG. 4 is a superimposition command when the oscillation frequency multiplying factor is 1.5 times. The superimposition command is obtained by calculating a sinusoidal superimposition command for each of two divided segments by the superimposition command calculation unit 13, the two divided segments including a forward movement segment and a backward movement segment with a peak position serving as a boundary that are obtained by dividing the oscillation phase for one oscillation by the oscillation phase division unit 12.

Figure 5:
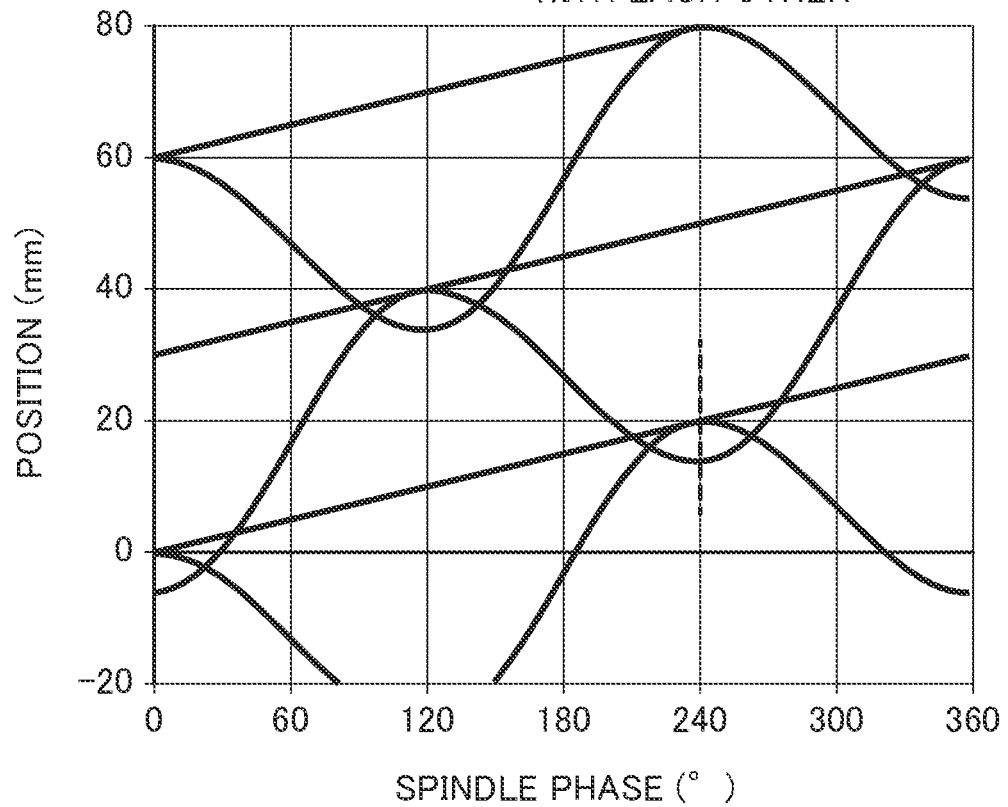
FIG. 5 is a diagram showing the peak positions of the superimposition commands in the oscillation cutting of an embodiment of the present disclosure.

FIG. 5 is a diagram showing the peak positions of the superimposition commands in the oscillation cutting of an embodiment of the present disclosure. Specifically, FIG. 5 is a diagram showing each successive pass of the superimposition command of FIG. 4. In FIG. 5, a horizontal axis represents a spindle phase) (°, and a vertical axis represents a position (mm). As shown in FIG. 5, the oscillation phase is divided into a plurality of segments, and the superimposition command is calculated for each of the segments, whereby the deviation in the peak position of the superimposition command is eliminated on the commands, and the peak positions coincide with each other. This makes it possible to prevent the air cutting from being horizontally long and reduce the deterioration in the surface roughness of the machined surface.

In the example shown in FIGS. 4 and 5, the superimposition command in each segment is calculated in the same sine wave, but this is not limited thereto. That is, the superimposition command calculation unit 13 may be configured to calculate a linear, curved or sinusoidal superimposition command for each of the divided segments, or may be configured to calculate a superimposition command having an arbitrary shape for each segment. The segments to be divided are not limited to having a constant width, and may be set to an arbitrary width. That is, the segments divided with different widths may be combined.

Figure 6:
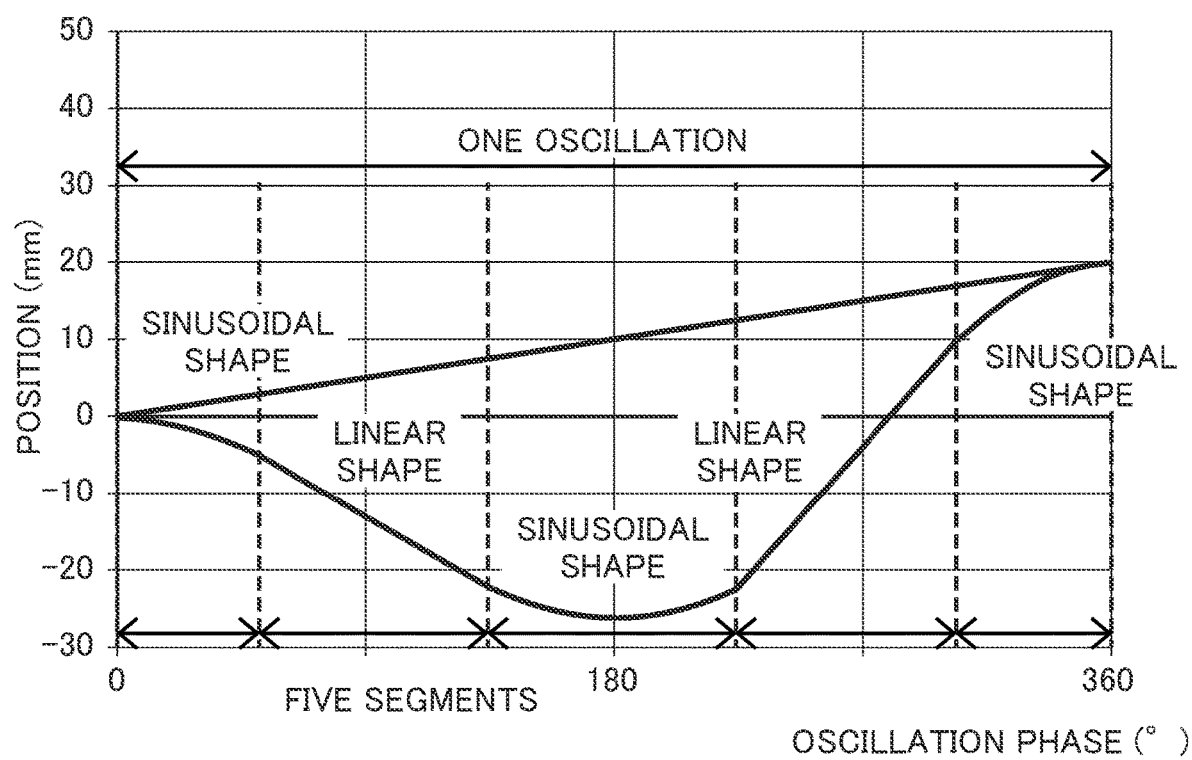
FIG. 6 is a diagram showing a superimposition command calculated for each of five segments into which an oscillation phase for one oscillation is divided, in the oscillation cutting of an embodiment of the present disclosure.

FIG. 6 is a diagram showing a superimposition command calculated for each of five segments into which an oscillation phase for one oscillation is divided, in the oscillation cutting of an embodiment of the present disclosure. In FIG. 6, a horizontal axis represents an oscillation phase (°), and a vertical axis represents a position (mm). The superimposition command shown in FIG. 6 is a superimposition command when the oscillation frequency multiplying factor is 1.5 times. The superimposition command is obtained by alternately calculating sinusoidal superimposition commands and linear superimposition commands in five segments into which the oscillation phase for one oscillation is divided at equal intervals.

In the oscillation cutting of the present embodiment, the superimposition command is calculated for each of a plurality of segments into which an oscillation phase is divided, and the movement command is obtained by connecting each superimposition command calculated, and therefore, in the above-described example of the superimposition command shown in FIGS. 4 and 5, the command form may change largely at the position (oscillation phase 180°) between the two divided segments. Therefore, the motor 30 cannot easily follow the superimposition command, which may cause the deviation of the actual peak position from the command. In such a case, as in the superimposition command shown in FIG. 6, the oscillation phase for one oscillation is divided into five segments to obtain the command having an arbitrary shape (sinusoidal or linear shape) in each segment, which makes it possible to calculate the superimposition command in which a change in the command form is small between the segments.

The superimposition command calculation unit 13 of the present embodiment may be configured to calculate the superimposition command in which a start point and an end point of the successive commands coincide with each other so that the superimposition commands in the respective divided segments are smoothly connected with each other. This makes it possible to smoothly connect the superimposition commands in the respective divided segments more reliably, and suppress the deviation in the peak position of the superimposition command more reliably.

Note that the machine tool control device 1 according to the present embodiment may further include a filtering unit that performs filtering so that a change in the superimposition command serving as the movement command is smoothened. Specifically, the filtering unit may be disposed between the superimposition command calculation unit 13 and the first adder 14 in FIG. 1, for example. As the filter, there can be used ones that can clamp a change amount in the command so that an inclination of the command does not exceed a threshold and can eliminate only the steep change, for example. This makes it possible to further smoothen the superimposition command and further improve the followability to the superimposition command.

Note that the machine tool control device 1 according to the present embodiment may further include a feed forward unit that superimposes the feed forward of the superimposition command serving as the movement command. Specifically, the feed forward unit may be disposed so that a feed forward value of the superimposition command is input to the position/speed control unit 17 in FIG. 1, for example. Although the superimposition command may be largely changed between segments, in the present embodiment, the change can be smoothened by superimposing the feed forward of the superimposition command, thereby further improving the followability to the superimposition command. In addition, it is possible to calculate the superimposition command having an arbitrary shape in which the responsiveness and disturbance of the machine tool are reflected.

According to the present embodiment, the following effects can be achieved. In the present embodiment, there are provided an oscillation condition setting unit 11 that sets oscillation conditions, an oscillation phase division unit 12 that divides an oscillation phase into a plurality of segments, a superimposition command calculation unit 13 that calculates a superimposition command serving as a movement command based on the oscillation conditions for each of the divided segments, and a position/speed control unit 17 that relatively oscillates a tool and a workpiece based on the superimposition command. According to the present embodiment, an oscillation phase is divided into a plurality of segments, and the superimposition command serving as a movement command is calculated for each of the segments, whereby the superimposition command (movement command) having a command form such that a peak position of the superimposition command corresponds to a predetermined phase can be calculated with respect to the desired arbitrary oscillation conditions. In addition, calculating the superimposition command for each of segments suppresses the deviation in the peak position of the superimposition command, which makes it possible to prevent the air cutting from being horizontally long and reduce the deterioration in the surface roughness of the machined surface.

It is noted that the present disclosure is not limited to the above-described embodiments, and includes modifications and improvements within the scope which can achieve the object of the present disclosure.

EXPLANATION OF REFERENCE NUMERALS

1 Machine tool control device
10 Servo control device
11 Oscillation condition setting unit
12 Oscillation phase division unit
13 Superimposition command calculation unit (movement command calculation unit)
14 First adder
15 Learning control unit
16 Second adder
17 Position/speed control unit (control unit)
30 Motor

The invention claimed is:

1. A machine tool control device that performs machining while relatively oscillating a tool and a workpiece, the machine tool control device comprising:
   an oscillation condition setting unit that sets oscillation conditions;
   an oscillation phase division unit that divides an oscillation phase into a plurality of segments;
   a superimposition command calculation unit that calculates a curved or sinusoidal superimposition command based on a superimposition of a position command according to machining conditions and the oscillation conditions for each of the divided segments so that the superimposition command in each of the divided segments is smoothly connected with each other in a curved manner at each boundary between the divided segments; and
   a control unit that relatively oscillates the tool and the workpiece based on the superimposition command.

2. The machine tool control device according to claim 1, further comprising:
   a filtering unit that performs filtering so that a change in the superimposition command is smoothened.

3. The machine tool control device according to claim 1, further comprising:
   a feed forward unit that superimposes feed forward of the superimposition command.

4. The machine tool control device according to claim 1, further comprising:
   a learning control unit that calculates a compensation amount of the superimposition command based on the superimposition command, and compensates the superimposition command by adding the calculated compensation amount to the superimposition command.

* * * * *